(12) United States Patent
Orr

(10) Patent No.: US 9,275,204 B1
(45) Date of Patent: Mar. 1, 2016

(54) ENHANCED NETWORK ACCESS-CONTROL CREDENTIALS

(71) Applicant: MARVELL INTERNATIONAL LTD., Hamilton (BM)

(72) Inventor: Michael Orr, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 13 days.

(21) Appl. No.: 13/626,598

(22) Filed: Sep. 25, 2012

Related U.S. Application Data

(60) Provisional application No. 61/540,423, filed on Sep. 28, 2011.

(51) Int. Cl.
*G06F 17/30* (2006.01)
*G06F 21/30* (2013.01)
*H04W 12/06* (2009.01)

(52) U.S. Cl.
CPC .............. *G06F 21/30* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 6,591,265 B1 * | 7/2003 | Erickson et al. | |
| 7,047,560 B2 * | 5/2006 | Fishman | G06F 21/31 380/270 |
| 7,185,359 B2 * | 2/2007 | Schmidt et al. | 726/2 |
| 7,437,550 B2 * | 10/2008 | Savage et al. | 713/156 |
| 7,444,517 B2 * | 10/2008 | Dayan et al. | 713/184 |
| 7,774,455 B1 * | 8/2010 | Tock et al. | 709/224 |
| 8,312,540 B1 * | 11/2012 | Kahn et al. | 726/22 |
| 2002/0095497 A1 * | 7/2002 | Satagopan et al. | 709/225 |
| 2003/0056096 A1 * | 3/2003 | Albert et al. | 713/168 |
| 2007/0136603 A1 * | 6/2007 | Kuecuekyan | 713/185 |
| 2008/0034198 A1 * | 2/2008 | He et al. | 713/151 |
| 2008/0060065 A1 * | 3/2008 | Wynn | H04L 63/0428 726/5 |
| 2008/0271109 A1 * | 10/2008 | Singh et al. | 726/1 |
| 2009/0003312 A1 * | 1/2009 | Velazquez et al. | 370/352 |
| 2009/0129301 A1 * | 5/2009 | Belimpasakis | 370/310 |
| 2009/0129307 A1 * | 5/2009 | Akhtar et al. | 370/312 |
| 2011/0125894 A1 * | 5/2011 | Anderson et al. | 709/224 |
| 2012/0167185 A1 * | 6/2012 | Menezes | H04L 9/3213 726/5 |

* cited by examiner

*Primary Examiner* — Shewaye Gelagay
*Assistant Examiner* — Khoi Le

(57) ABSTRACT

In aspects of enhanced network access-control credentials, a network access device includes a network interface for data communication with network-connected devices via a network. The network access device implements an access control manager that receives a network access request from a requesting device to access the network, where the network access request includes authentication credentials. The access control manager can then modify the network access request to generate a modified network access request, and initiate communication of the modified network access request to an authentication server that authenticates the requesting device to the network based on the modified network access request.

14 Claims, 6 Drawing Sheets

ENHANCED NETWORK ACCESS-CONTROL CREDENTIALS

RELATED APPLICATION

This application claims priority to U.S. Provisional Patent Application Ser. No. 61/540,423 filed Sep. 28, 2011, the disclosure of which is incorporated by reference herein in its entirety.

BACKGROUND

The Background described in this section is included merely to present a general context of the disclosure. The Background description is not prior art to the claims in this application, and is not admitted to be prior art by inclusion in this section.

Computing and/or communication devices, such as computers, mobile phones, tablet devices, and many other types of wired and wireless devices are designed to access and connect to computer and data networks, such as local-area-networks (LANs), intranets, and the Internet. The devices are generally implemented to communicate and exchange data over a network via a wired or wireless gateway device, access point, switch, router, or any type of similar network access device. A common task of a network access device is network access control, and determining whether a user and/or device will be allowed to connect to a network and access controlled resources. A network access device can be implemented to allow access to a network, or a subset of the network, to potential users and devices that have authorized access.

SUMMARY

This Summary introduces concepts of enhanced network access-control credentials, and the concepts are further described below in the Detailed Description and/or shown in the Figures. Accordingly, this Summary should not be considered to describe essential features nor used to limit the scope of the claimed subject matter.

In one aspect of enhanced network access-control credentials, a network access device includes a network interface for data communication with network-connected devices via a network. The network access device implements an access control manager that receives a network access request from a requesting device to access the network, where the network access request includes authentication credentials. The access control manager can then modify the network access request to generate a modified network access request, and initiate communication of the modified network access request to an authentication server that authenticates the requesting device to the network based on the modified network access request.

A method is described for receiving a network access request from a requesting device to access a network, where the network access request may include authentication credentials and the request is received at a network access device that communicates with network-connected devices via the network. The method also includes modifying the network access request at the network access device to generate a modified network access request, and then communicating the modified network access request to an authentication server that authenticates the requesting device to the network based on the modified network access request.

Another method is described for initiating a query from a network access device that communicates with network-connected devices via a network, where the query is formatted as key-value pair authentication credentials (e.g., a username and password, or other type of key-value pair). The method includes communicating the key-value pair authentication credentials to an authentication server that confirms the key-value pair, and replies with an authentication response. The method also includes receiving the authentication response from the authentication server, where the authentication response is formatted as a response to the query from the network access device.

BRIEF DESCRIPTION OF THE DRAWINGS

Details of enhanced network access-control credentials are described with reference to the following Figures. The same numbers may be used throughout to reference like features and components that are shown in the Figures.

DETAILED DESCRIPTION

Figure 1:
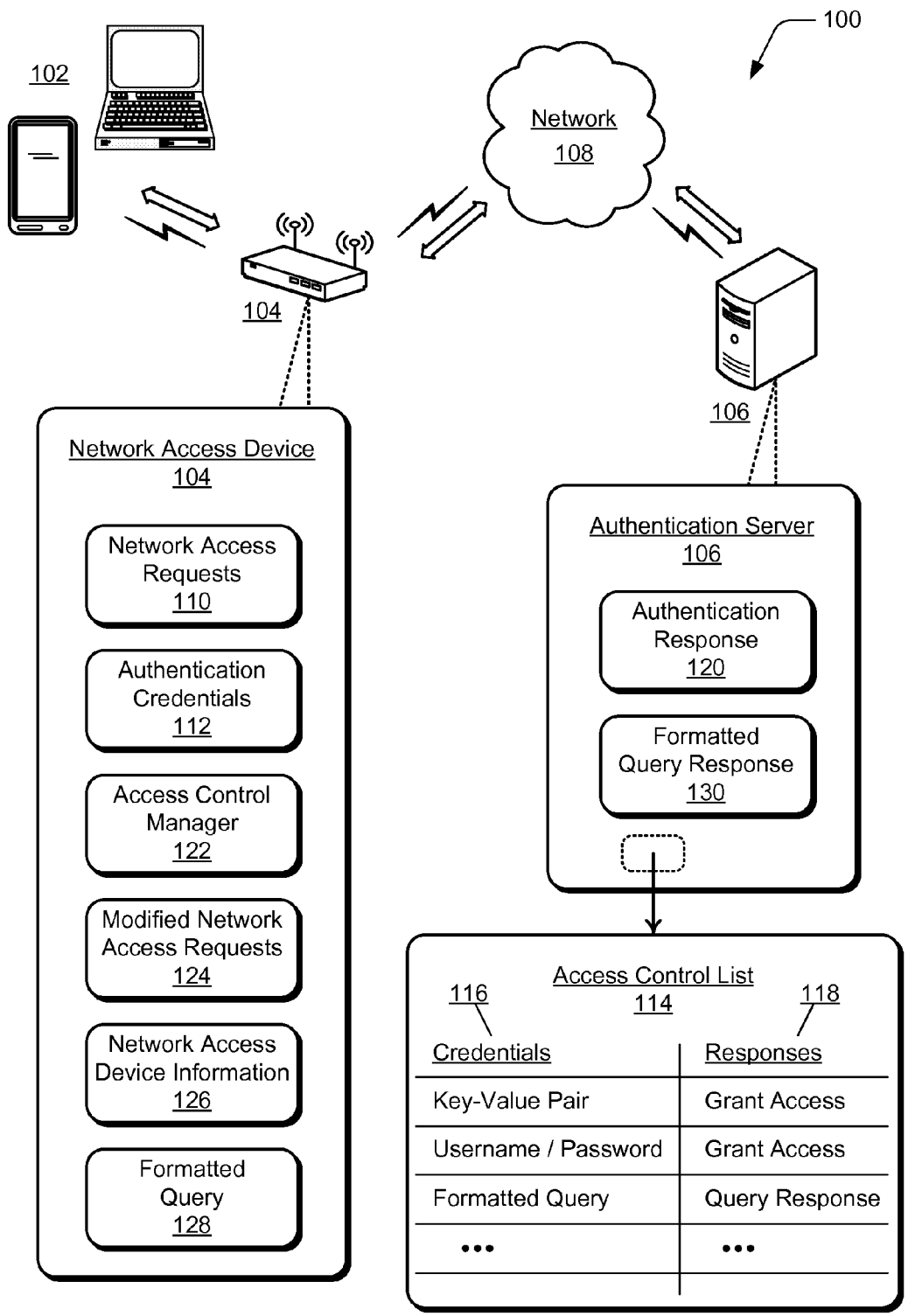
FIG. 1 illustrates an example system in which aspects of enhanced network access-control credentials can be implemented.

Authentication for network access is often based on credentials provided by a user and/or device that requests access to a network, and an authentication server associated with a network service provider authenticates a user or device for network access based on the credentials. A central authentication server can be used to hold the rights-repository, and a challenge and response process is initiated between a requesting device and a remote authentication server over a network, such as a telecommunications network. For example, a requesting device requests that network access be granted and provides authentication credentials when challenged by the authentication server. A network access device (e.g., a gateway device) controls the physical access to the network for the requesting device, and the authentication server, although typically remote, is accessible to the network access device.

In an example, a requesting device requests network access via a network access device, typically by trying to establish a network connection. The network access device sends the network access request to the authentication server, and the network access device allows the requesting device a limited level of partial access to facilitate challenge and response messages between the requesting device and the authentication server. The authentication server challenges the requesting device for credentials via the network access device, and the requesting device provides the requested credentials. The authentication server can then verify the provided credentials, and notify the network access device that network access is granted (or not), and may also provide additional access-attributes to be applied, such as quotas, access limits, etc. The network access device can then grant the requesting device network access as instructed by the authentication server. This type of authentication process may generally be referred to as network access control (NAC), network access protocol (NAP), or Web-based authentication (WBA).

Aspects of enhanced network access-control credentials provide that a network access device, such as a gateway device, access point, switch, router, or any type of similar device, can modify a network access request from a device that is requesting network access, and then communicate a modified network access request, and/or an additional network access request, to an authentication server. An access control manager of a network access device can modify a network access request, such as a request that includes key-value pair authentication credentials (e.g., a username and password, or other type of key-value pair), by modifying the key and/or value of the authentication credentials; changing the key and/or value of the authentication credentials; replacing the authentication credentials with a different key-value pair; adding an additional key-value pair set of credentials to the authentication credentials; and/or by adding network access device information to the authentication credentials. The authentication server can then confirm or authenticate the modified network access request based on entries in an access control list (ACL) that is maintained by the authentication server. Typically, authentication servers already have an existing mechanism to "get key-value pair" and send back a response from a database unchanged, and generally support and/or expect a key-value pair as a username and password.

A network access device (e.g., gateway device) can also communicate an initial or additional network access request to an authentication server, such as another network access request in addition to the network access request received from a requesting device that is relayed unchanged. The network access device can modify or leave unchanged a network access request received from a requesting device and communicate the modified or unchanged network access request, along with an additional network access request, to an authentication server to elicit a response from the server that will determine the attributes of handling the requesting device that is requesting network access. An incoming network access request can be modified to elicit a more detailed response from an authentication server; the unmodified network access request can also be communicated to the authentication server; and in parallel, additional network access requests can be communicated to the same or different servers.

The modified, unmodified, and/or additional network access requests may appear as unrelated to an authentication server. However, the gateway device is implemented to combine all of the responses from the one or more servers into one logical action plan for allowing the requesting device network access. As noted, the network access requests can be communicated to one or different authentication servers. For example, some authentication servers may only support unmodified network access requests, while other servers implement aspects of enhanced network access-control credentials as described herein.

While features and concepts of enhanced network access-control credentials can be implemented in any number of different devices, systems, environments, and/or configurations, aspects of enhanced network access-control credentials are described in the context of the following example devices, systems, and methods.

FIG. 1 illustrates an example system 100 in which aspects of enhanced network access-control credentials can be implemented. The example system includes various devices 102, which may be any one or combination of a mobile phone, tablet device, computing device, communication, entertainment, gaming, navigation, and/or other type of wired or portable electronic device. The devices 102 are generally implemented with a network interface for data communication with network-connected devices via a network. Additionally, any of the devices 102 can be implemented with various components, such as a processor and/or memory system, as well as any number and combination of differing components as further described with reference to the example device shown in FIG. 6.

The example system 100 also includes a network access device 104 and an authentication server 106. Any of the devices and servers can communicate via a network 108, which can be implemented to include wired and/or wireless networks. The network 108 can also be implemented using any type of network topology and/or communication protocol, and can be represented or otherwise implemented as a combination of two or more networks, to include IP-based networks and/or the Internet. The network 108 may also include mobile operator networks that are managed by mobile operators, such as a communication service provider, cell-phone provider, and/or Internet service provider.

Any of the devices 102 can initiate a network access request (e.g., as a requesting device) to access the network 108, such as an intranet, a local-area-network (LAN), or the Internet. The network access device 104 is an example of a wired or wireless gateway device, access point, switch, router, or any type of similar device that manages and controls network access for various devices. Typically, the network access device 104 receives a network access request 110 from a requesting device 102. The network access request 110 is then communicated from the network access device 104 to the authentication server 106, which initiates a challenge back to the requesting device 102. The requesting device 102 can then provide authentication credentials 112, such as a key-value pair (e.g., username and password or other type of key-value pair), that are routed via the network access device 104 to the authentication server 106, which authenticates the requesting device 102 to the network 108. The authentication server 106 maintains an access control list (ACL) 114 that includes a table of credentials 116 (e.g., key-value pair, username and password combinations, and the like) and corresponding responses 118 to requests, such as an authentication response 120 to a network access request 110.

In this example system, the network access device 104 includes an access control manager 122, such as a software application (e.g., computer-executable instructions), that can be executed by a processor, or memory and processor system, to implement aspects of enhanced network access-control credentials as described herein. The access control manager 122 may be integrated in an operating system of the device, or alternatively, may be implemented as an independent application that is executable on the device to manage and control network access. Generally, the access control manager 122 may be implemented and/or described in the general context of software, firmware, hardware (e.g., fixed logic circuitry), applications, modules, or any combination thereof. In implementations, the access control manager 122 and other components may be implemented as a system-on-chip (SoC) in the network access device 104, such as described with reference to the example SoC shown in FIG. 2.

The network access device 104 can receive a network access request 110 from a requesting device 102 to access the network 108. As described above, a network access request 110 may include authentication credentials 112, such as a username and password supplied by a user of the device, a key-value pair, or other types of authentication credentials 112 corresponding to a requesting device 102. In some aspects, a requesting device does not explicitly provide any credentials, but rather tries to access a controlled resource (e.g. the network 108) and this access attempt is itself the request with whatever information the network access device 104 can detect about the device attempting the access. For example, a printer device will frequently not provide credentials, and responsive to an access attempt, the network access device 104 will use the only information that it has about the printer, such as the hardware MAC address as if this was the ID part of login credentials. In aspects, the access control manager 122 can modify the network access request 110 that is received from the requesting device 102 to generate a modified network access request 124. The network access device 104 communicates the modified network access request 124 to the authentication server 106 to authenticate the requesting device 102 to the network based on the modified network access request 124.

To modify a network access request 110, the access control manager 122 is implemented to modify the key and/or value of the key-value pair authentication credentials 112 (e.g., modify a username and/or password); change the key and/or value of the key-value pair authentication credentials 112; and/or replace the authentication credentials 112 with a different key-value pair generated by the access control manager 122. Alternatively or in addition, the access control manager 122 can add an additional key-value pair set of credentials to the authentication credentials 112 that are provided by the requesting device 102 to modify the network access request 110.

The access control manager 122 can add the additional key-value pair set of credentials as network access device information 126, such as to indicate a physical location of the network access device 104 and/or to indicate when the requesting device 102 is allowed to access the network 108 via the network access device 104. For example, the network access device information 126 that is added to the authentication credentials 112 may include a username "P6S7B2F5" to indicate port6, switch7, building2, floor5 of the network access device 104. The network access device information 126 that is added to the authentication credentials 112 may also include a password, such as "BH" to indicate business hours, or "WKND" to indicate that the requesting device 102 can be granted network access during off-business or weekend hours.

Further to the example, a user of a requesting device 102 that initiates a network access request 110 may provide a username and password as the authentication credentials 112, such as "employee#2" and "fdal07". The access control manager 122 at the network access device 104 may then add the additional username and password set of credentials, such as the username "P6S7B2F5" and the password "BH" to indicate the location of the network access device 104 and that a requesting device 102 should only be granted network access during business hours. If the network access request 110 is initiated during a weekend (i.e., on a Saturday or Sunday), and although the user employee#2 would typically be allowed network access during normal business hours, the network access request 110 will not be authenticated by the authentication server 106, and access will be denied during the weekend.

This example illustrates that additional levels of network access control can be implemented, such as to grant network access (or not) based on not only user and/or requesting device authentication credentials 112 (e.g., a key-value pair, such as a username and password), but also based on a location and when the network access will be allowed. Although the example describes one additional set of credentials added to the authentication credentials 112 received from the requesting device 102, any number of additional sets of credentials may be utilized. For example, a second additional key-value pair set of credentials may include identification of the requesting device 102. The authentication server 106 may then grant network access based on the username and password provided by the employee, the location of the network access device 104 and when network access may be allowed, and based on the identification of the requesting device 102.

Based on the described examples, one can appreciate the extensibility of utilizing the access control list 114 at the authentication server 106 to manage a system of network access devices, such as in a company or business that has a hundred or more network access devices to serve hundreds of employees. Rather than having to configure or program every network access device 104 in a company intranet individually, such as to limit "employee#2" network access through one network access device 104, the access control list 114 maintained by the authentication server 106 can be updated to grant network access for "employee#2" only when the employee requests network access via a particular requesting device 102 at the designated network access device 104.

In a broader aspect of enhanced network access-control credentials, the access control manager 122 at the network access device 104 can initiate a formatted query 128 that is formatted as key-value pair authentication credentials, or is some other designated format of an authentication request. The network access device 104 communicates the formatted query 128 (e.g., as the key-value pair authentication credentials, such as a username and password) to the authentication server 106 that confirms the key-value pair, as an entry in the access control list 114. The authentication server 106 can then reply with an authentication response that is formatted as a query response (e.g., a formatted query response 130). The authentication server 106 is simply performing an authentication as it is implemented to do when the network access device 104 initiates a query 128 that appears as an authentication request.

For example, the network access device 104 may initiate a formatted query 128 as to whether a software update is available, such as with a model number of the device as the username and a software version number as the password of a key-value pair. The authentication server 106 can then reply with a formatted query response 130 (e.g., a form of an authentication response 120) that indicates either no software update, or with a configuration update for the network access device 104. A query response 130 with a configuration update may include a URL (uniform resource locator) to direct the network access device 104 to a software update, or other configuration update. Similarly, a query response 130 from the authentication server 106 may include an operation parameter for the network access device 104, or any other type of response that can be defined as an entry in the access control list 114 maintained by the authentication server 106.

In implementations, the example system 100 may include any number of devices 102, network access devices 104, and authenticating servers 106. The authentication server 106 can receive a set of suitably formatted credentials, and provide a retrieved entry from the repository, such as from the access control list 114 maintained at the authentication server 106. The network access device 104 (e.g., a gateway device) can supplant the credentials provided by a requesting device 102 (also referred to herein as a "supplicant") with credentials generated by the gateway device itself, and provide enhanced access control functionality without any changes to the authentication server 106 or the protocols used to communicate between the network access device 104 and the authentication server 106.

For example, it is common for a requesting device 102 to be granted access to the network 108 based on provided authentication credentials 112 (e.g., usually in the form of a username and password). However, this is typically a binary decision, and a user is granted network access (or not) based only on these credentials. If the network access device 104 supplants the process by simulating a virtual requesting device 102, where the username and password credentials are derived from some system attribute (e.g., the interface where the actual device is requesting to gain access), then the network access device 104 can use the authentication server responses to both sets of credentials to refine the access given to the requesting device 102, such as by only allowing access based on a given subset of interfaces, locations, or dates, etc.

A simple example of this is enhancing the feature that grants access to networks based on a requesting device MAC (media access control) address, which is commonly provided by network equipment, such as switches and routers. This feature, usually modeled on the IEEE 802.1x standard, entails the getaway device sending the requesting device MAC address as either a username, a password, or both to a standard authenticating server (most commonly a RADIUS—remote authentication dial in user service). The server examines a repository for an entry matching the username and password, which was generated by the gateway device, and returns a yes/no answer.

In aspects of enhanced network access-control credentials, the network access device 104 could send the MAC address as either the username or password, and send some other relevant attribute as the matching half of the credentials. For example, the ingress interface ID, or the ingress system ID could be sent as the password, while the gateway device MAC address is sent as a user-ID. This would allow granting users access on some interfaces, or only on some systems, without changing the authentication process or protocol, and without change to the authentication server 106. Accordingly, this can be enabled with third-party authentication servers.

Note that the system is generic, in that a network access device 104 can either modify the credentials sent from a requesting device 102 to the authentication server 106 (since, by necessity, the credentials pass via the gateway device), replace them completely, or send additional sets of credentials. From the point of view of the authentication server 106, nothing is changed. The credentials are received and the relevant results of a repository search are sent in response. This allows the network access device 104 to be used in a more active and flexible role for network access-control, as opposed to just being a relay for device-generated credentials to the authentication server 106. Additionally, a network administrator is provided better, more flexible, and nuanced access control with no need to modify the authentication server 106, and no requirement to use a proprietary non-standard system. The network administrator can add to the repository describing the access rights to be granted for the enhanced network access-control credentials.

Figure 2:
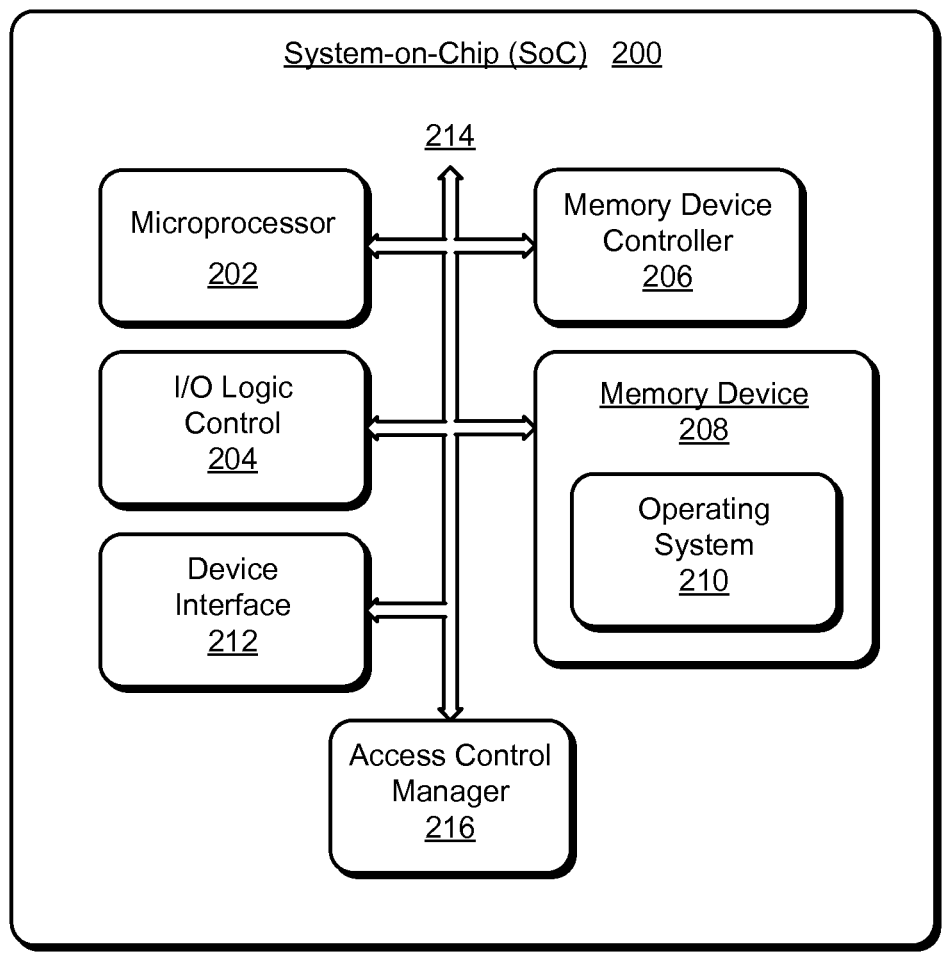
FIG. 2 illustrates an example system-on-chip (SoC) environment in which aspects of enhanced network access-control credentials can be implemented.

FIG. 2 illustrates an example system-on-chip (SoC) 200, which can implement various aspects of enhanced network access-control credentials as described herein. The SoC may be implemented in any type of network access device, such as the network access device 104 described with reference to FIG. 1. The network access device 104 may be implemented as any type of gateway device, access point, switch, router, or similar device. The SoC 200 can be integrated with electronic circuitry, a microprocessor, memory, input-output (I/O) logic control, communication interfaces and components, as well as other hardware, firmware, and/or software to implement a network access device 104.

In this example, the SoC 200 is integrated with a microprocessor 202 (e.g., any of a microcontroller or digital signal processor) and input-output (I/O) logic control 204 (e.g., to include electronic circuitry). The SoC 200 includes a memory device controller 206 and a memory device 208, such as any type of a nonvolatile memory and/or other suitable electronic data storage device. The SoC can also include various firmware and/or software, such as an operating system 210 that is maintained by the memory and executed by the microprocessor.

The SoC 200 includes a device interface 212 to interface with a device or other peripheral component, such as when installed in the network access device 104 as described herein. The SoC 200 also includes an integrated data bus 214 that couples the various components of the SoC for data communication between the components. The data bus in the SoC may also be implemented as any one or a combination of different bus structures and/or bus architectures.

In aspects of enhanced network access-control credentials, the SoC 200 includes an access control manager 216 that can be implemented as computer-executable instructions maintained by the memory device 208 and executed by the microprocessor 202. Alternatively, the access control manager 216 can be implemented as hardware, in firmware, fixed logic circuitry, or any combination thereof that is implemented in connection with the I/O logic control 204 and/or other processing and control circuits of the SoC 200. Examples of the access control manager 216, as well as corresponding functionality and features, are described with reference to the access control manager 122 shown in FIG. 1.

Example methods 300, 400, and 500 are described with reference to respective FIGS. 3, 4, and 5 in accordance with one or more aspects of enhanced network access-control credentials. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
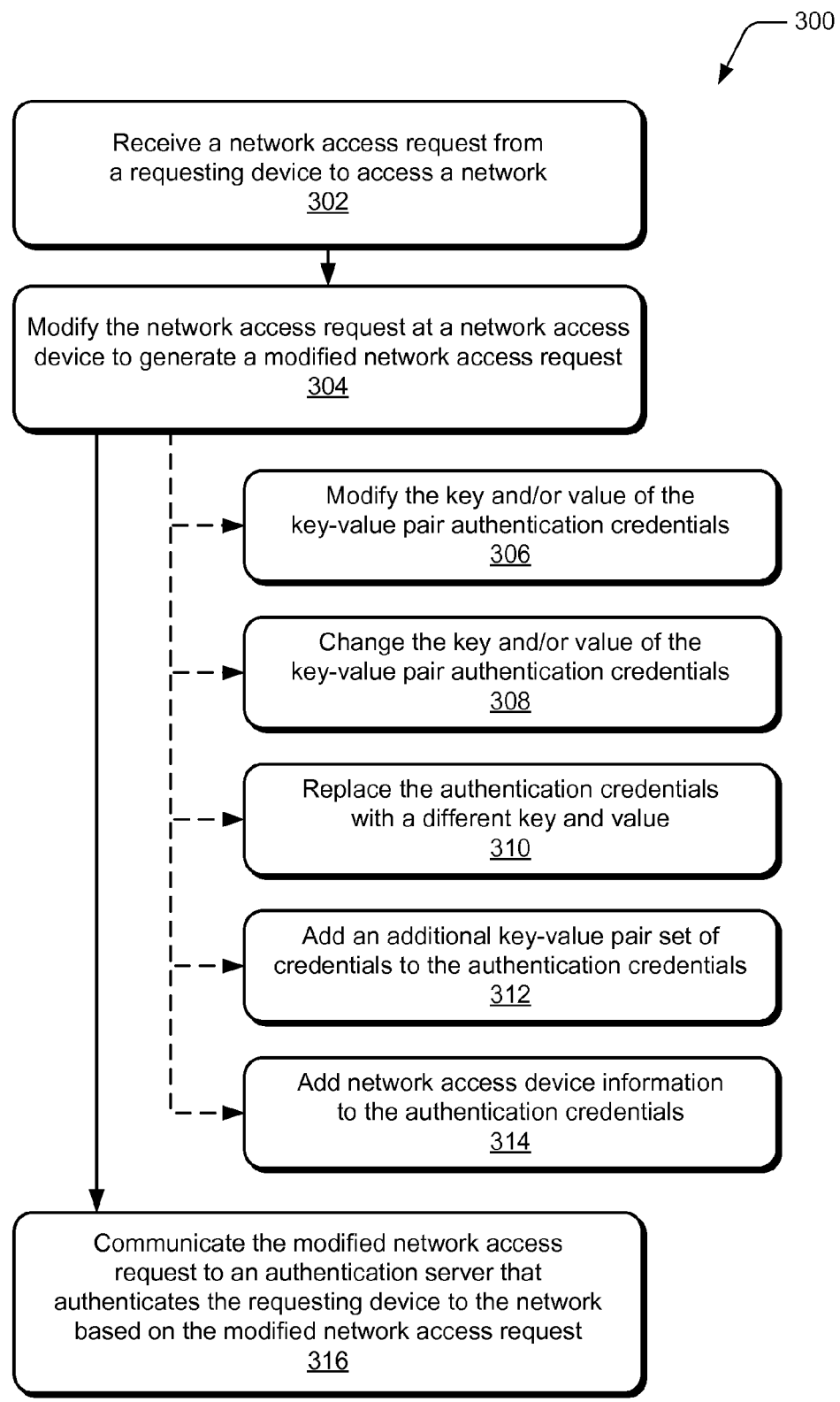
FIG. 3 illustrates example methods of enhanced network access-control credentials in accordance with one or more aspects.

FIG. 3 illustrates example method(s) 300 of enhanced network access-control credentials, and is described with reference to the network access device 104. The order in which the method is described is not intended to be construed as a limitation, and any number of the described method operations can be combined in any order to implement the method, or an alternate method.

At 302, a network access request is received from a requesting device to access a network. For example, the access control manager 122 implemented at the network access device 104 (FIG. 1) receives a network access request 110 from a requesting device 102, and the network access request 110 includes authentication credentials 112, such as a key-value pair (e.g., username and password combination or other type of key-value pair).

At 304, the network access request is modified at a network access device to generate a modified network access request. For example, the access control manager 122 at the network access device 104 modifies the network access request 110 that is received from the requesting device 102 to generate a modified network access request 124. Optionally, modifying the network access request 110 can include modifying the key and/or value of the key-value pair authentication credentials (at 306); changing the key and/or value of the authentication credentials (at 308); replacing the authentication credentials with a different key-value pair (at 310); adding an additional key-value pair set of credentials to the authentication credentials (at 312); and/or adding network access device information to the authentication credentials (at 314). The network access device information 126 that is added to the authentication credentials can indicate a physical location of the network access device 104, or any other type of device information.

At 316, the modified network access request is communicated to an authentication server that authenticates the requesting device to the network based on the modified network access request. For example, the access control manager 122 at the network access device 104 initiates communication of the modified network access request 124 to the authentication server 106 that authenticates the requesting device 102 to the network 108 based on the modified network access request 124.

Figure 4:
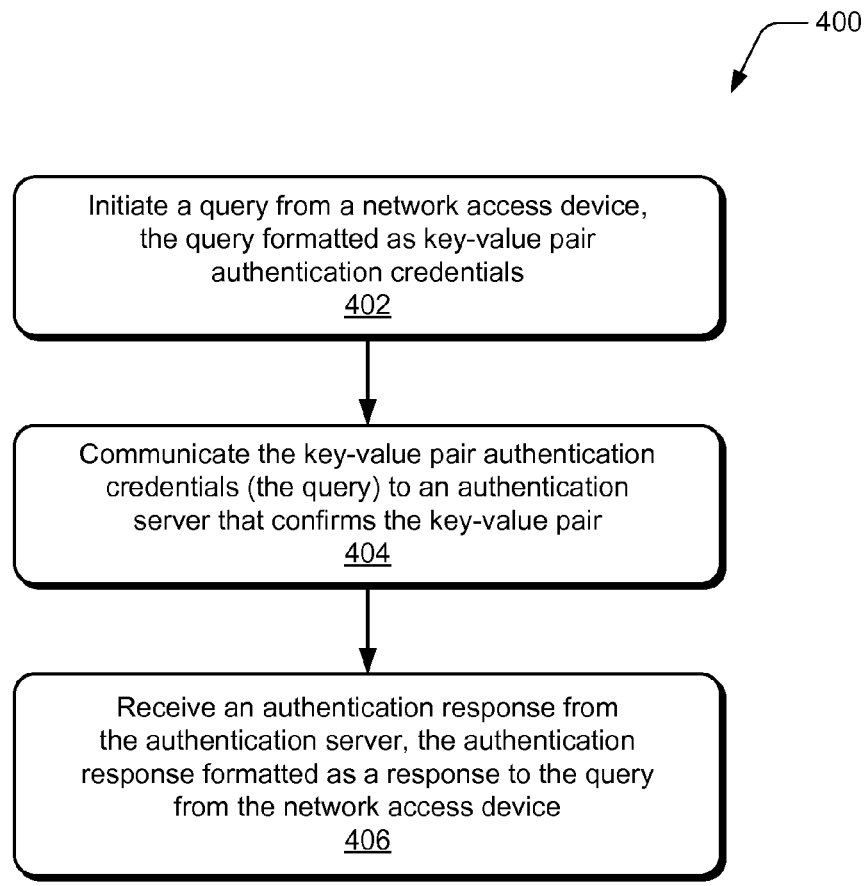
FIG. 4 illustrates example methods of enhanced network access-control credentials in accordance with one or more aspects.

FIG. 4 illustrates example method(s) 400 of enhanced network access-control credentials, and is described with reference to the network access device 104. The order in which the method is described is not intended to be construed as a limitation, and any number of the described method operations can be combined in any order to implement the method, or an alternate method.

At 402, a query is initiated from a network access device, where the query is formatted as key-value pair authentication credentials. For example, the access control manager 122 implemented at the network access device 104 (FIG. 1) initiates a formatted query 128 as a key-value pair authentication credentials (e.g., username and password or other type of key-value pair).

At 404, the key-value pair authentication credentials (i.e., the query) are communicated to an authentication server that confirms the key-value pair, and replies with an authentication response. For example, the access control manager 122 at the network access device 104 initiates communication of the key-value pair authentication credentials (i.e., the formatted query 128) to the authentication server 106 that confirms the key-value pair as an entry in the access control list 114, and replies with a formatted query response 130 (e.g., a form of an authentication response 120).

At 406, an authentication response is received from the authentication server, where the authentication response is formatted as a response to the query from the network access device. For example, the access control manager 122 at the network access device 104 receives the formatted query response 130 (e.g., a form of an authentication response 120) from the authentication server 106, and in aspects, the authentication response may include a configuration update and/or an operation parameter for the network access device 104.

Figure 5:
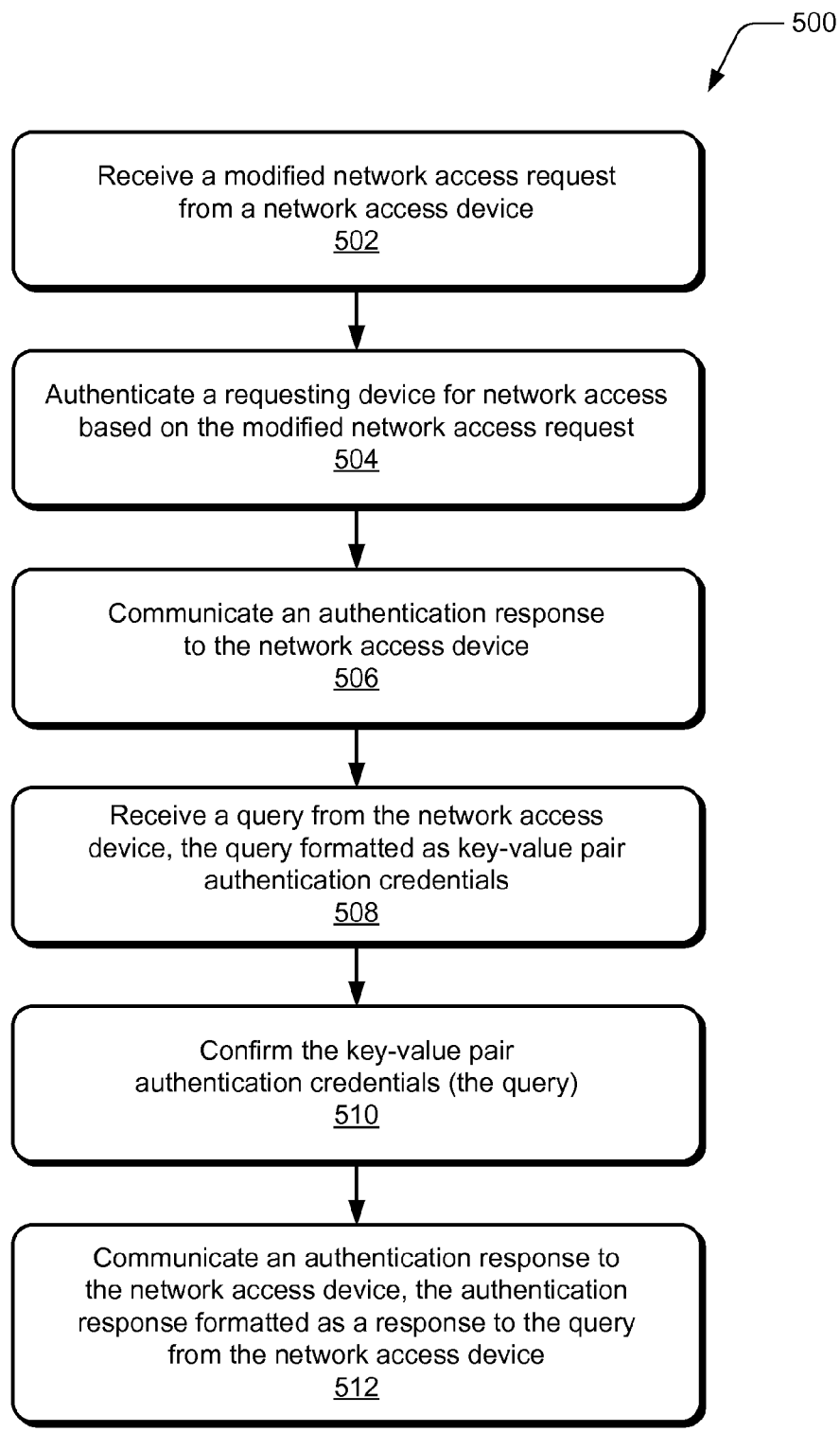
FIG. 5 illustrates example methods of enhanced network access-control credentials in accordance with one or more aspects.

FIG. 5 illustrates example method(s) 500 of enhanced network access-control credentials, and is described with reference to the authentication server 106. The order in which the method is described is not intended to be construed as a limitation, and any number of the described method operations can be combined in any order to implement the method, or an alternate method.

At 502, a modified network access request is received from a network access device. For example, the authentication server 106 (FIG. 1) receives a modified network access request 124 from the network access device 104. The modified network access request 124 is generated by the access control manager 122 implemented at the network access device 104 when a requesting device 102 initiates a network access request 110 to access the network 108.

At 504, a requesting device is authenticated for network access based on the modified network access request. For example, the authentication server 106 authenticates the requesting device 102 for network access based on the modified network access request 124, as determined from the access control list 114 that is maintained by the authentication server 106. At 506, an authentication response is communicated to the network access device 104. For example, the authentication server 106 communicates an authentication response 120 to the network access device 104, which can then grant network access to the requesting device 102.

At 508, a query is received from the network access device, where the query is formatted as key-value pair authentication credentials. For example, the authentication server 106 receives a formatted query 128 as key-value pair authentication credentials (e.g., a username and password, or other type of key-value pair) from the network access device 104.

At 510, the key-value pair authentication credentials (i.e., the query) is confirmed. For example, the authentication server 106 confirms the key-value pair authentication credentials (i.e., the formatted query 128) with the access control list 114. At 512, an authentication response is communicated to the network access device, where the authentication response is formatted as a response to the query from the network access device. For example, the authentication server 106 replies and communicates a formatted query response 130 (e.g., a form of an authentication response 120) to the network access device 104.

Figure 6:
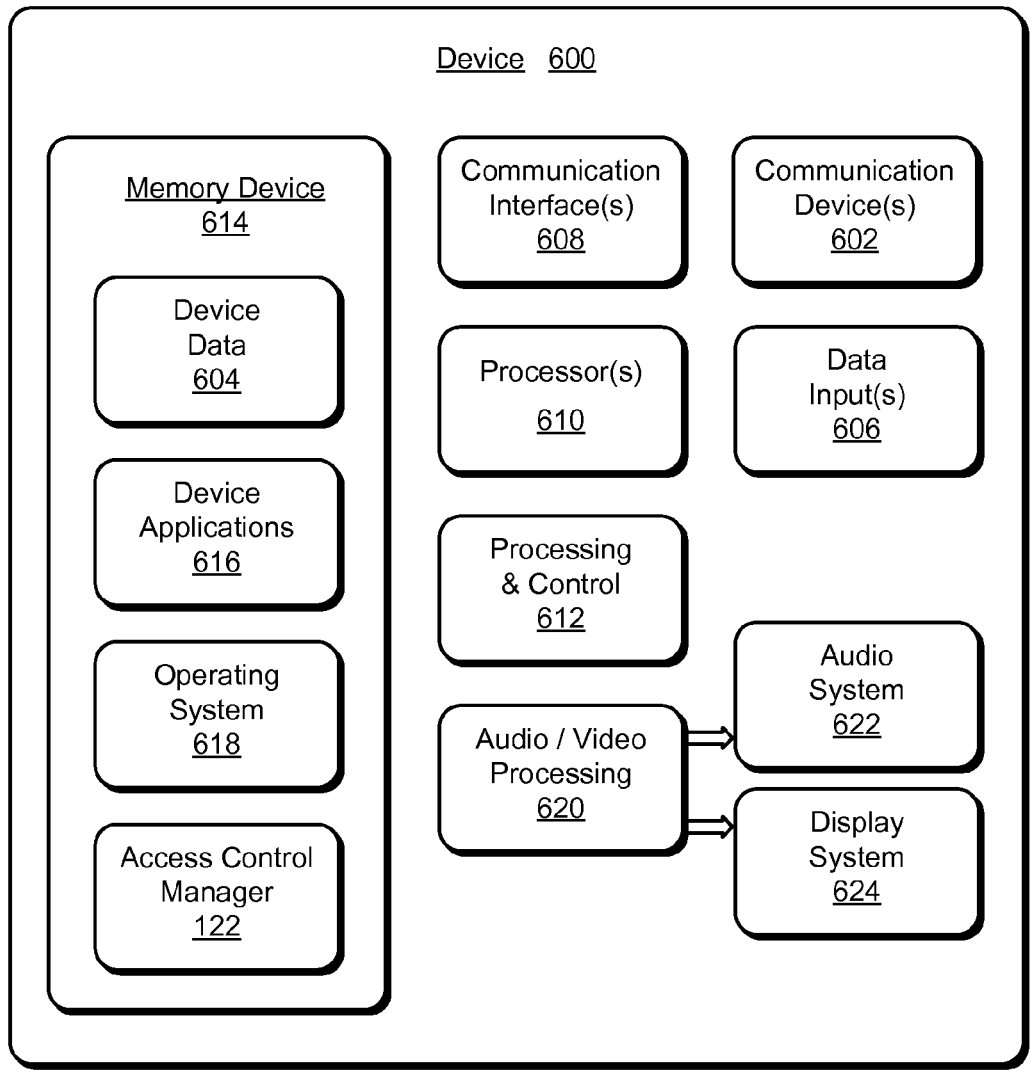
FIG. 6 illustrates various components of an example device that can implement aspects of enhanced network access-control credentials.

FIG. 6 illustrates various components of an example device 600 that can be implemented as any of the devices or servers described with reference to the previous FIGS. 1-5, such as any type of a device 102 that requests network access, a network access device 104 (e.g., a gateway device, switch, router, and the like), an authentication server 106, and any other type of electronic and/or computing device. The device may also be implemented to include the example system-on-chip (SoC) described with reference to FIG. 2. The device may be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is communicated between devices, data packets of the data, etc. The device 600 also includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 600 also includes communication interfaces 608, such as any one or more of a serial, parallel, network, or wireless interface. The communication interfaces provide a connection and/or communication links between the device and a network 108 by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, other types of information and/or data, and device applications 616. For example, an operating system 618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications 616 also include an access control manager 122 to implement aspects of enhanced network access-control credentials when the device 600 is implemented as the network access device 104. Although shown implemented as a software application or module in the example device 600, the access control manager 122 may be implemented in the general context of software, firmware, hardware (e.g., fixed logic circuitry), or any combination thereof.

The device 600 may also include an audio and/or video processing system 620 that generates audio data for an audio system 622 and/or generates display data for a display system 624. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although aspects of enhanced network access-control credentials have been described in language specific to features and/or methods, the subject of the appended claims is not necessarily limited to the specific features or methods described. Rather the specific features and methods are disclosed as example implementations of enhanced network access-control credentials.

What is claimed is:

1. A network access device, comprising:
   a network interface configured for data communication with network connected devices via a network;
   a memory and processor system to execute stored computer instructions that when executed implement an access control manager configured to:
   receive a network access request from a requesting device to access the network, the requesting device separate from, external to, and communicating via the network with the network access device, the network access request including a key-value pair;
   modify the network access request to generate a modified network access request by modifying the key-value pair and adding information into the modified network access request about the network access request;
   replace the network access request with the modified network access request; and
   communicate the modified network access request to an authentication server that is configured to authenticate the requesting device to the network based on the modified key-value pair and the information about the network access request that is included in the modified network access request, the authentication server separate from, external to, and communicating via the network with the network access device;
   wherein the access control manager is further configured to communicate the modified network access request to the authentication server in parallel with an additional communication of the modified network access request to a different authentication server; and
   wherein the access control manager is further configured to receive responses from the authentication server and the different authentication server and combine the received responses into a logical action plan for allowing the requesting device access to the network.

2. The network access device as recited in claim 1, wherein the access control manager is further configured to:
   initiate a query from the network access device, the query formatted as a query key-value pair;
   communicate the query key-value pair to the authentication server that is configured to confirm the query key-value pair and reply with an authentication response; and
   receive the authentication response from the authentication server, the authentication response formatted as a response to the query and including an operating parameter defining an attribute of how the network access device is to handle the requesting device that is attempting to access the network.

3. The network access device as recited in claim 1, wherein the memory and processor system are embodied on a system-on-chip (SoC) to implement the access control manager.

4. The network access device as recited in claim 2, wherein the authentication response that is formatted as the response to the query includes a configuration update for the network access device.

5. The network access device as recited in claim 1, wherein the access control manager for modifying the key-value pair replaces the key-value pair with a different key-value pair.

6. The network access device as recited in claim 1, wherein the access control manager for modifying the key-value pair modifies a key or a value of the key-value pair.

7. The network access device as recited in claim 1, wherein the access control manager is configured to modify the key-value pair by adding an additional key-value pair generated by the network access device.

8. The network access device as recited in claim 1, wherein the access control manager for adding information about the network access request includes instructions for formatting the added information as an additional key-value pair.

9. The network access device as recited in claim 1, wherein the access control manager for adding information about the network access request includes instructions for adding information that indicates a physical location of the network access device through which the requesting device is attempting to access the network.

10. The network access device as recited in claim 1, wherein the access control manager for adding information about the network access request adds information that indicates a time period during which the requesting device is allowed to access the network.

11. A method implemented by at least hardware of a network access device, the method comprising:
receiving, via a network interface, a network access request from a requesting device to access a network, the network access request including a key-value pair, the network access request received at the network access device that communicates with network-connected devices via the network, the network access device including a network control manager, the network access device separate from, external to, and communicating via the network with the requesting device;
modifying the network access request at the network access device to generate a modified network access request that is stored in a memory of the network access device, the modifying comprising modifying the key-value pair and adding information about the network access request;
replacing the network access request with the modified network access request in the memory; and
communicating the modified network access request in electronic form via the network interface to an authentication server that authenticates the requesting device to the network based on the modified key-value pair and the information about the network access request that is included in the modified network access request, the authentication server separate from, external to, and communicating via the network with the network access device;
wherein communicating the modified network access request to the authentication server includes additionally communicating the modified network access request in parallel to a different authentication server; and
in response to receiving responses, by the network access device, from the authentication server and the different authentication server, combining the received responses into a logical action plan for allowing the requesting device access to the network.

12. The method as recited in claim 11, wherein modifying the key-value pair adds an additional key-value pair, the additional key-value pair provided by the requesting device.

13. A method, comprising:
receiving, by a network access device, a network access request from a requesting device to access a network, and determining from the network access request a username and a password, wherein the username and password are associated with a first access right for accessing the network;
modifying, by the network access device, the network access request to generate a modified network access request by modifying the username and the password, wherein the modified username and password are associated with a second access right that is different than the first access right;
replacing the network access request with the modified network access request; and
communicating the modified network access request to an authentication server that authenticates the requesting device to the network based on the modified username and password that is included in the modified network access request;
wherein communicating the modified network access request to the authentication server includes additionally communicating the modified network access request in parallel to a different authentication server in order to receive responses for controlling access to the network based at least on the modified network access request.

14. The method of claim 13 further comprising:
in response to receiving responses from the authentication server and the different authentication server from network communications, combining the received responses into a logical action plan in electronic form for allowing the requesting device access to the network.

* * * * *